US008464962B2

(12) United States Patent
Lockhart

(10) Patent No.: US 8,464,962 B2
(45) Date of Patent: Jun. 18, 2013

(54) 3-STAGE TEMPERATURE CONTROL VALVE

(75) Inventor: John Lockhart, Cave Creek, AZ (US)

(73) Assignee: Showerstart, LLC, Scottsdale, AZ (US)

( * ) Notice: Subject to any disclaimer, the term of this patent is extended or adjusted under 35 U.S.C. 154(b) by 466 days.

(21) Appl. No.: 12/807,719

(22) Filed: Sep. 13, 2010

(65) Prior Publication Data

US 2011/0180741 A1    Jul. 28, 2011

Related U.S. Application Data

(63) Continuation-in-part of application No. 11/788,884, filed on Apr. 23, 2007, now Pat. No. 7,878,417, and a continuation-in-part of application No. 11/154,404, filed on Jun. 15, 2005, now Pat. No. 7,681,804.

(60) Provisional application No. 60/794,735, filed on Apr. 25, 2006, provisional application No. 60/655,192, filed on Jan. 14, 2005.

(51) Int. Cl.
*G05D 23/02* (2006.01)

(52) U.S. Cl.
USPC ..................................... 236/93 A; 236/99 K

(58) Field of Classification Search
USPC ........... 236/93 A, 93 B, 93 R, 99 K; 137/457, 137/495, 508, 269
See application file for complete search history.

(56) References Cited

U.S. PATENT DOCUMENTS

| | | | | |
|---|---|---|---|---|
| 5,105,994 | A * | 4/1992 | Jouillat et al. | 222/341 |
| 5,141,153 | A * | 8/1992 | Jeffress | 236/93 B |
| 5,197,516 | A * | 3/1993 | Smietana | 137/625.62 |
| 5,259,554 | A * | 11/1993 | Ewing et al. | 236/87 |
| 5,379,936 | A * | 1/1995 | Kline | 236/12.2 |
| 5,507,466 | A * | 4/1996 | Yowell et al. | 251/16 |
| 5,623,990 | A * | 4/1997 | Pirkle | 165/298 |
| 5,819,785 | A * | 10/1998 | Bardini | 137/337 |
| 5,881,956 | A * | 3/1999 | Cohen et al. | 239/333 |
| 6,230,734 | B1 * | 5/2001 | Grebnev et al. | 137/220 |
| 6,499,666 | B1 * | 12/2002 | Brown | 236/34.5 |
| 6,543,478 | B2 * | 4/2003 | Kline | 137/606 |
| 7,083,114 | B2 * | 8/2006 | Maeurer et al. | 239/102.2 |

* cited by examiner

*Primary Examiner* — Mohammad Ali
(74) *Attorney, Agent, or Firm* — Robert C. Klinger

(57) ABSTRACT

A temperature control valve that effectively manages fluid pressure therethrough, including pressure differentials which may exist therein, such as from the upstream port to the downstream port, and about a piston slidingly disposed therewithin proximate a fluid flow path. In one embodiment a 3 stage valve is provided whereby fluid flows therethrough when the piston is in a first position, fluid flow is inhibited in a second piston position, and an override third position whereby fluid flows therethrough. When the piston is in the second position, the fluid pressure differential across the piston is balanced and an axial spring force on the piston is relatively small, thereby reducing any subsequent axial force required to advance the piston to the third free flow position, and allowing the valve to be comprised of cheaper materials including plastic.

29 Claims, 20 Drawing Sheets

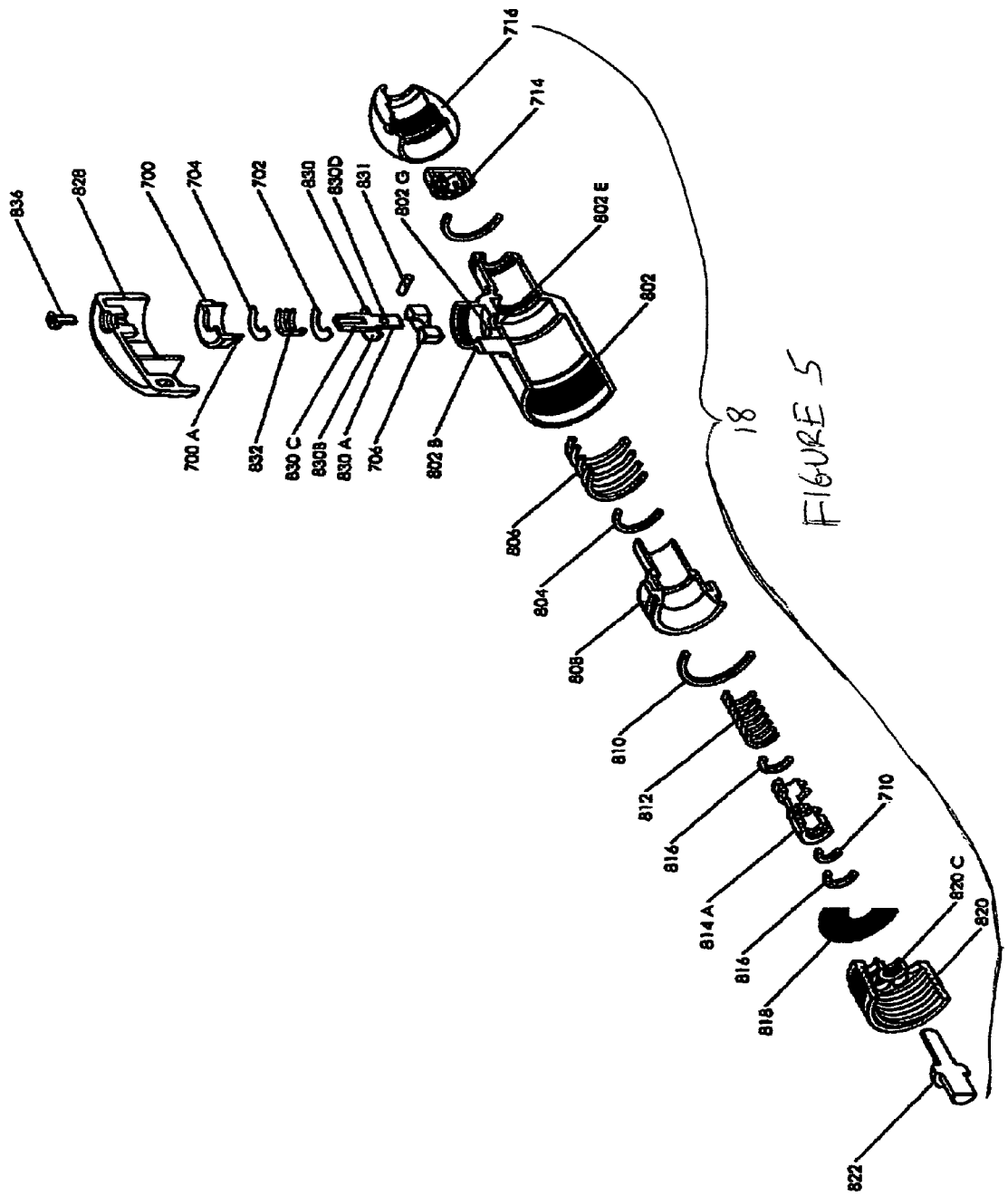

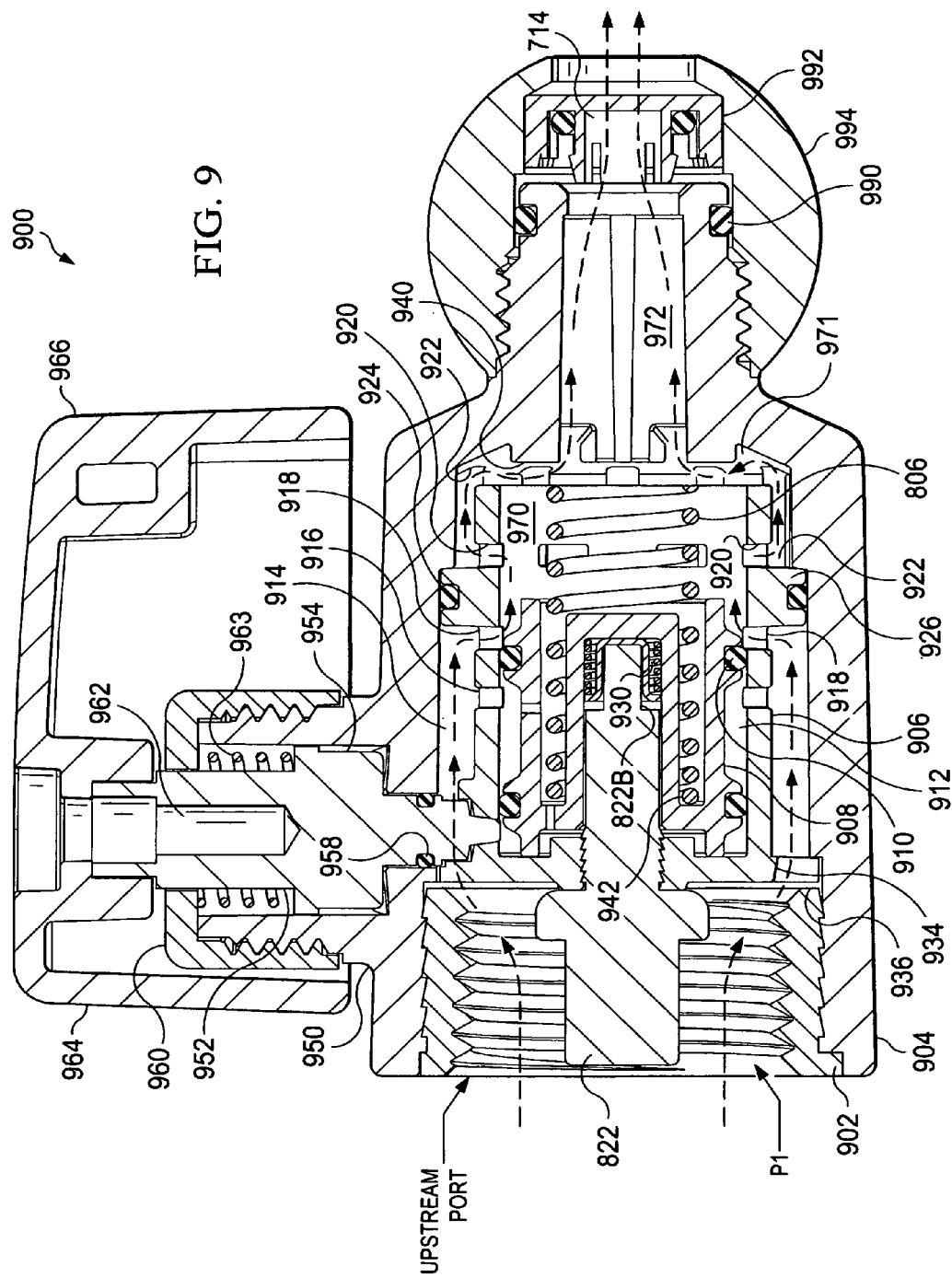

3-STAGE TEMPERATURE CONTROL VALVE

PRIORITY CLAIM

This application is a continuation-in-part of U.S. patent application Ser. No. 11/788,884 filed Apr. 23, 2007 now U.S. Pat. No. 7,878,417, which claims priority from U.S. Provisional Patent Application Ser. No. 60/794,735, entitled "TEMPERATURE CONTROLLED RESTRICTIVE VALVE" filed Apr. 25, 2006, which application is a continuation-in-part of and claims priority from U.S. patent application Ser. No. 11/154,404, filed Jun. 15, 2005 now U.S. Pat. No. 7,681,804, which claims priority of U.S. Provisional Patent Application Ser. No. 60/655,192 filed Jan. 14, 2005, the specifications of which are incorporated herein by reference.

FIELD OF THE INVENTION

The present invention is generally related to restrictive valves, and more specifically to controlled fluid flow restrictive valves with a temperature controlled cutoff port, including a resettable release mechanism for overriding the temperature controlled flow cutoff port.

BACKGROUND OF THE INVENTION

It is often necessary, in both consumer and commercial contexts, to wait for a water source to reach a suitable temperature prior to use. For example, it is very common for an individual to turn on the hot water in the shower, or at a sink, and then wait for an extended length of time until the water is at the correct temperature.

Additionally, vast amounts of water and energy are wasted each year due to the delay in receiving water at the correct temperature. That is, as most individuals are reluctant to stand by the shower and continuously monitor the water temperature for many minutes, a significant amount of hot water is simply lost down the drain. This increases both water costs as well as heating costs. Multiplied by the number of individuals that must engage in this practice on a daily basis, the waste is significant.

A flow control valve utilized in a household, such as to provide the delivery of water to a shower head, typically sees a water pressure of at least 100 psi. This high water pressure can affect the operation of the water control valve when it includes moving parts. For instance, the pressure at an upstream port relative to the pressure at a downstream port can negatively affect the performance of the shut off valve. Moreover, this high pressure can require operational portions of the valve to be comprised of more expensive and stronger materials to withstand any pressure differentials between the upstream port, and the downstream port.

There is desired an improved controlled restrictive valve that effectively manages a pressure differential, which is simpler in design, and which can be made of less expensive materials, such as plastic.

SUMMARY OF INVENTION

The present invention achieves technical advantage as a temperature control valve that effectively manages fluid pressure therethrough, including pressure differentials which may exist therein, such as from the upstream port to the downstream port, and about a piston slidingly disposed therewithin proximate a fluid flow path. In one embodiment a 3 stage valve is provided whereby fluid flows therethrough when the piston is in a first position, fluid flow is inhibited in a second piston position, and an override third position whereby fluid flows therethrough. When the piston is in the second position, the fluid pressure differential across the piston is balanced and an axial spring force on the piston is relatively small, thereby reducing any subsequent axial force required to advance the piston to the third free flow position, and allowing the valve to be comprised of a cheaper material such as plastic.

Only one moving part is provided within the valve body, namely, the piston. A temperature controlled actuator, such as paraffin actuator, is configured to axially advance the piston as a function of the fluid temperature. When the fluid temperature reaches a predetermined temperature, the actuator advances the piston to the second position. A piston spring is biased against the piston, and which spring force is overcome when the upstream fluid pressure is permitted to be provided to a proximal end of the piston, this fluid pressure advancing the piston to the third position. When the piston is in the second position, the differential pressure between the piston proximal end and the piston distal end is substantially equal. This configuration allows the piston, the valve body and other valve materials to be comprised of less expensive plastic materials.

BRIEF DESCRIPTION OF THE DRAWINGS

FIG. 5 is an exploded view of an alternate preferred embodiment of the valve assembly with some additional and/or different features not illustrated in the previous drawings.

FIG. 9 is an illustration of another alternate preferred embodiment of the valve assembly whereby the sliding member is removed, and the piston is axially slidably within a stationery sleeve, wherein the piston is shown in the first position permitting fluid flow therethrough;

DETAILED DESCRIPTION OF THE PRESENT INVENTION

Figure 1:
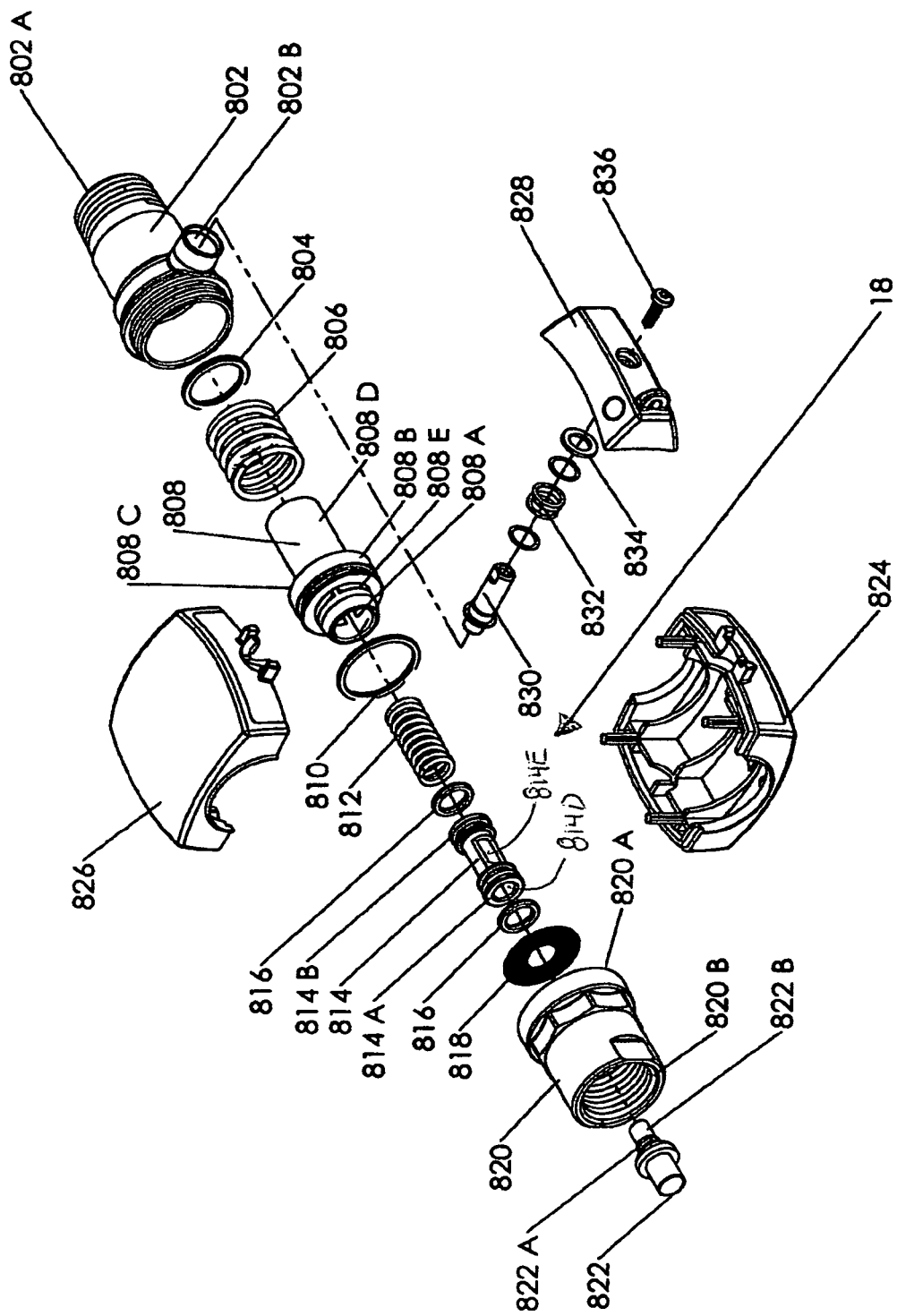
FIG. 1 is an exploded perspective view of the valve assembly.

Referring now to FIGS. 1-5B, there is shown an exploded view of a first embodiment of the present invention assembly. The valve assembly 18 is comprised of the following components: a main body rear 802, a main body O-ring 804, a slide spring 806, a slide 808, a slide O-ring 810, a piston spring 812, a piston 814, two piston O-rings 816, a screen 818, a body front 820, an actuator 822, a release pin 830, a release pin spring 832, and a pin retention ring 834. The valve assembly housing 12 is comprised of the following components: a housing first part 824, a housing second part 826, and a handle 828.

The main body O-ring 804, slide spring 806, and the longer end of the slide 808 are operably inserted into the wider, threaded end of the body rear 802. The main body is comprised of body rear 802 and body front 820. The piston spring 812, a first piston O-ring 816, the piston 814, and a second piston O-ring 816 are operably inserted into the wider, threaded end of the body rear 802. The screen 818 and the slide O-ring 810 are operably inserted into the wider end of the body front 820. The wider, threaded end of the body rear 802 is operably coupled to the wider end of the body front 820 to enclose the aforementioned components. The temperature sensor and actuator 822 is operably inserted into the narrower end of the body front 820. The release pin 830 is operably inserted into body rear 802 with the release pin spring 832. The housing first part 824 and the housing second part 826 are operably coupled to substantially enclose the valve assembly 18 and the handle 828 is operably coupled to the release pin 830. In one exemplary embodiment, a handle screw 836 is used to operably couple the handle 828 with release pin 830.

Body rear 802 further includes main body outlet port 802A, release pin housing 802B, spring retainer 802D, and stop lip 802C. Slide 808 further includes slide nose 808A, slide head 808B, slide head lower surface 808C, hollow slide body 808D, and slide ports 808E for controlling the flow of water through the valve assembly. Piston spring 812 is dimensioned for receipt into hollow slide body 808D and to abut at a front end piston base 814B and at a second end spring retainer 802D. Piston 814 includes piston head 814A, piston base 814B, piston stem 814C, and piston head cavity 814D. Piston head 814A includes a piston head cavity 814D for receipt of actuator nose 822B there into. Body front 820 includes body end shoulder 820A capable of receiving and stopping the motion of slide 808 as urged in an upstream direction by slide spring 806. Body front 820 also defines, at an upstream end, inlet port 820B. Body front 820 is seen to have threaded walls for threaded engagement with body rear 802. Actuator 822 is seen to have threaded walls 822A for threaded engagement with threaded walls 820C of body front 820. Actuator 822 also has actuator nose 822B shaped to fit snug within piston head cavity 814D as seen in FIG. 1A, for example. FIG. 1A also illustrates a channel 814E (see also FIGS. 5B and 5C) through piston head 814A, which will allow a small amount of water to flow through the valve even when in the shutoff position illustrated in FIG. 2A.

Figure 1A:
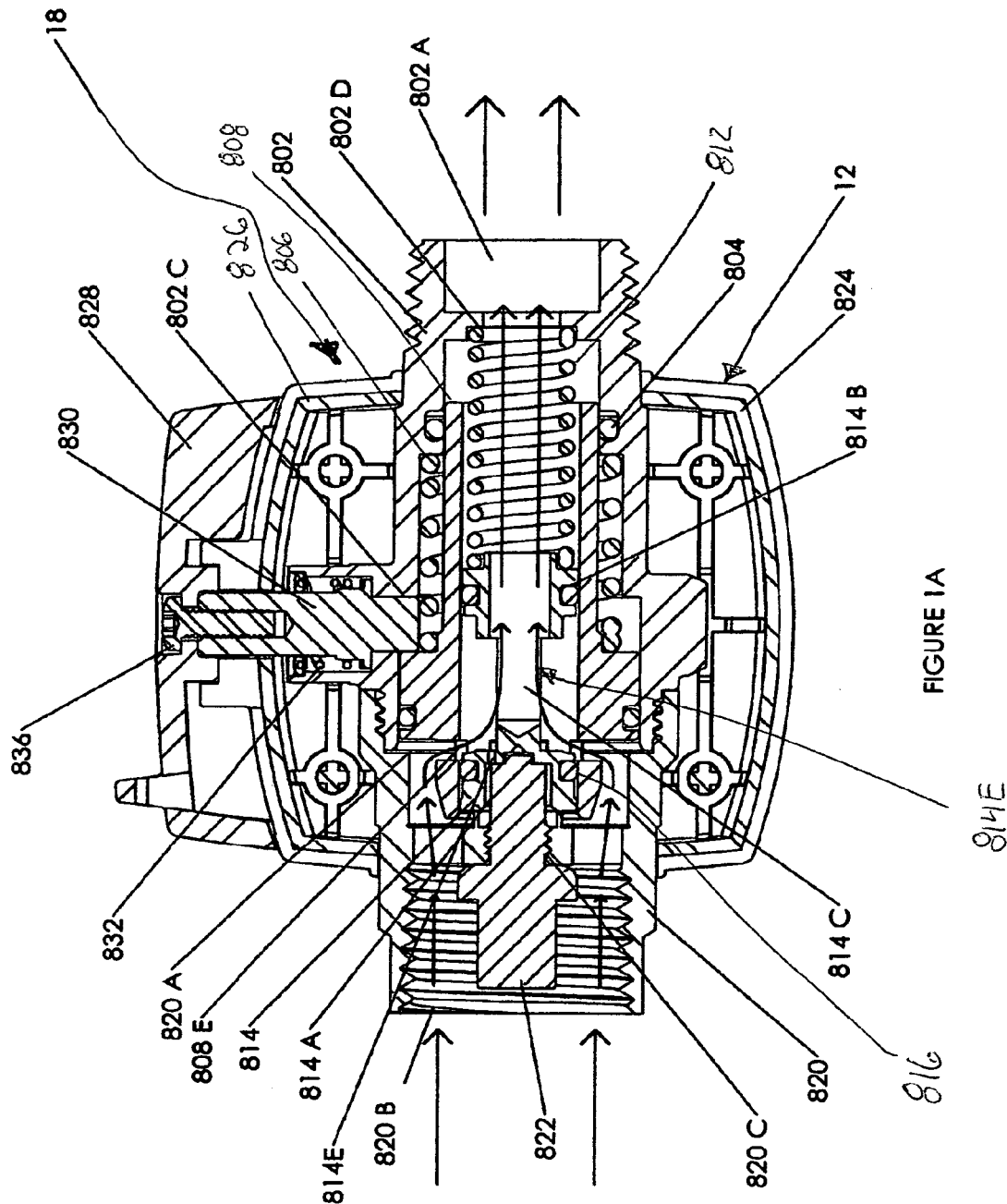
FIG. 1A is a top elevational view through a section of the valve assembly showing with arrows the water flow.
Figure 1B:
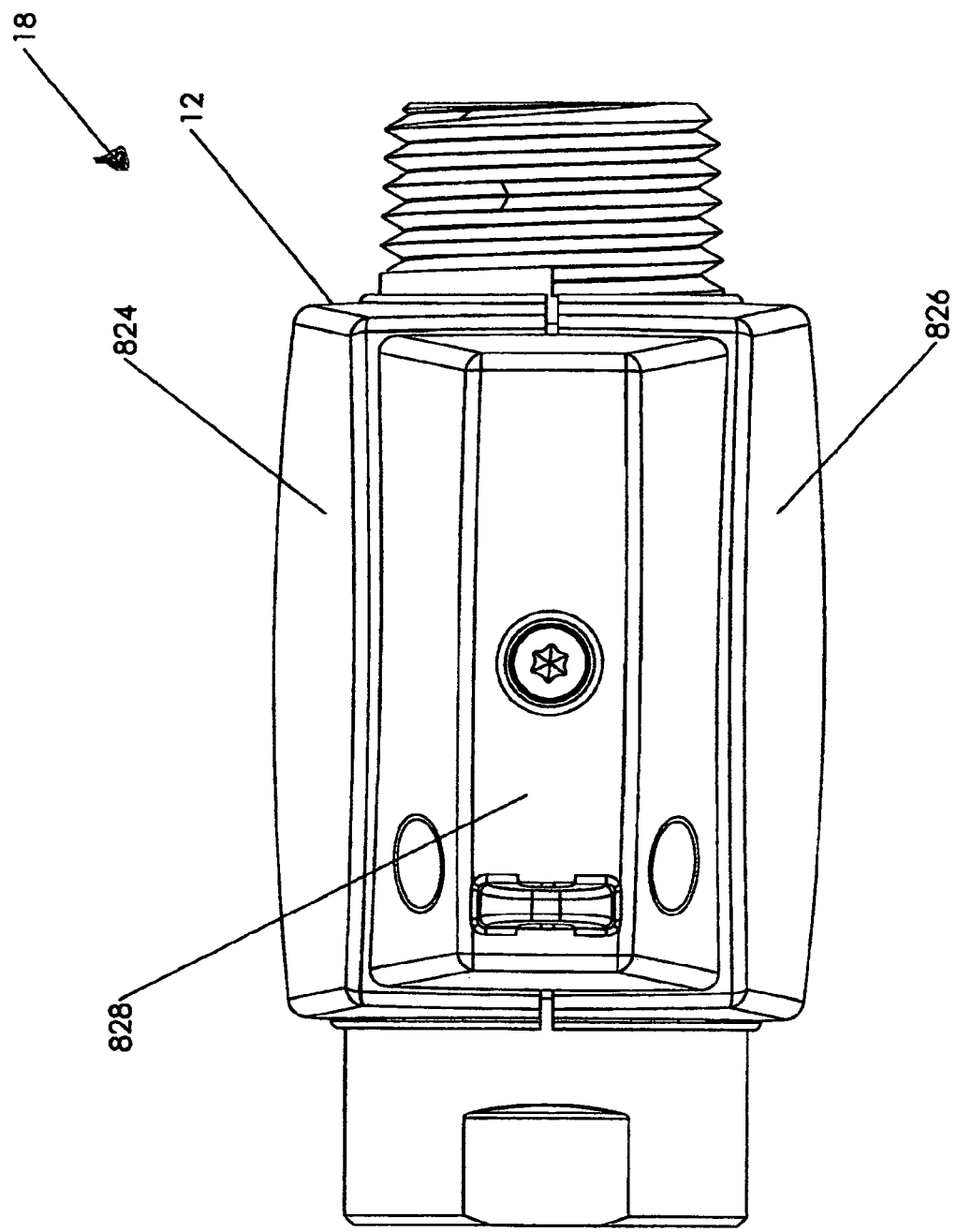
FIG. 1B is an external side elevational view of the valve assembly.

FIGS. 1, 1A, and 1B illustrate valve assembly 18. FIGS. 1A and 1B illustrate Applicant's novel valve assembly 18 in an open condition (cool water flow through slide ports 808E illustrated by arrows) and with the override locked out or disengaged. In the condition illustrated in FIGS. 1A and 1B, an increase in water temperature above a predetermined level will cause piston 814 to move to the right as indicated in FIG. 2A, the piston moving within slide 808, so as to shut off fluid flow through slide ports 808E when piston head 814A has moved far enough, that is, to the position as illustrated in FIG. 2A.

Figure 2A:
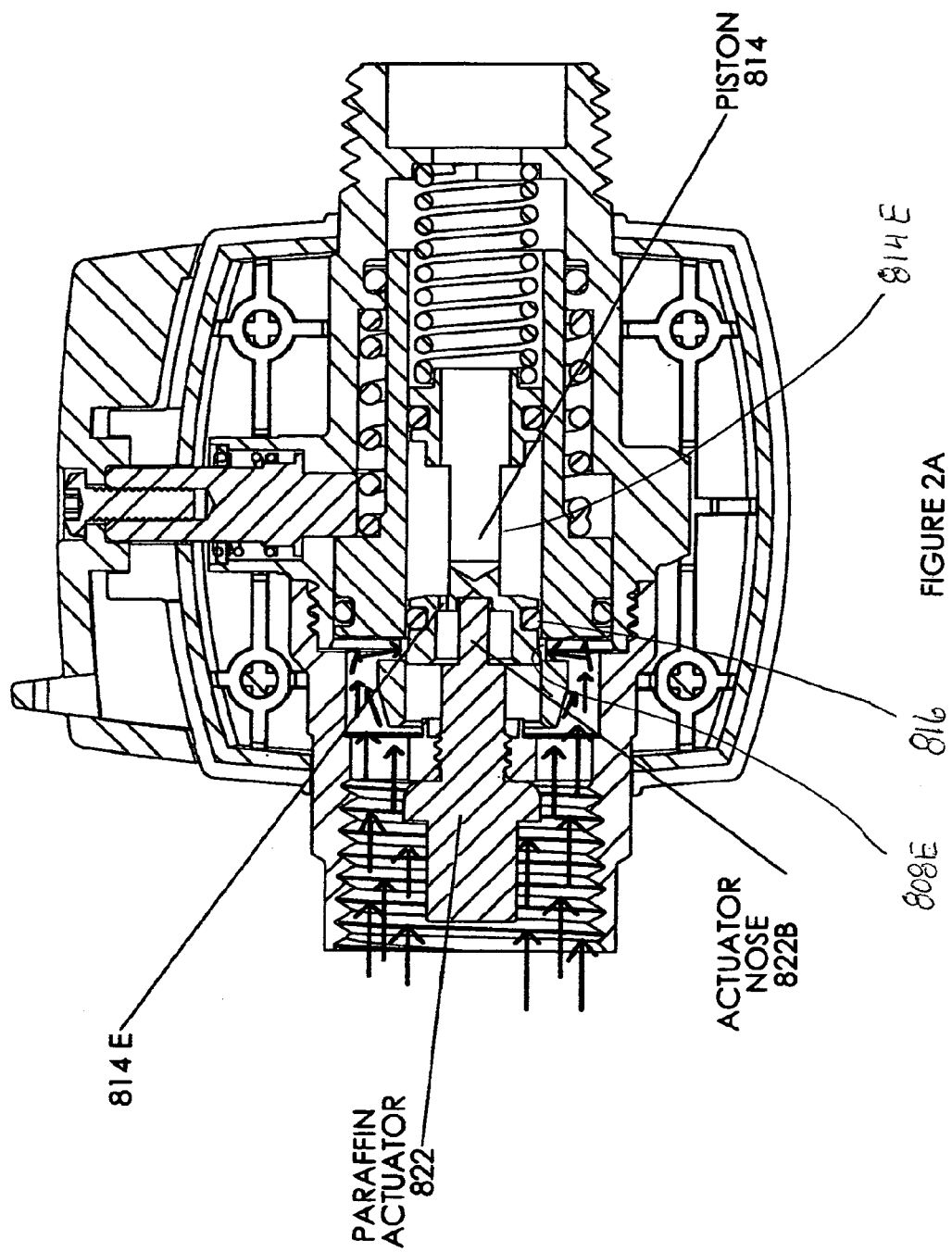
FIG. 2A is a top sectional elevational view of the valve assembly showing with arrows the water flow.
Figure 2B:
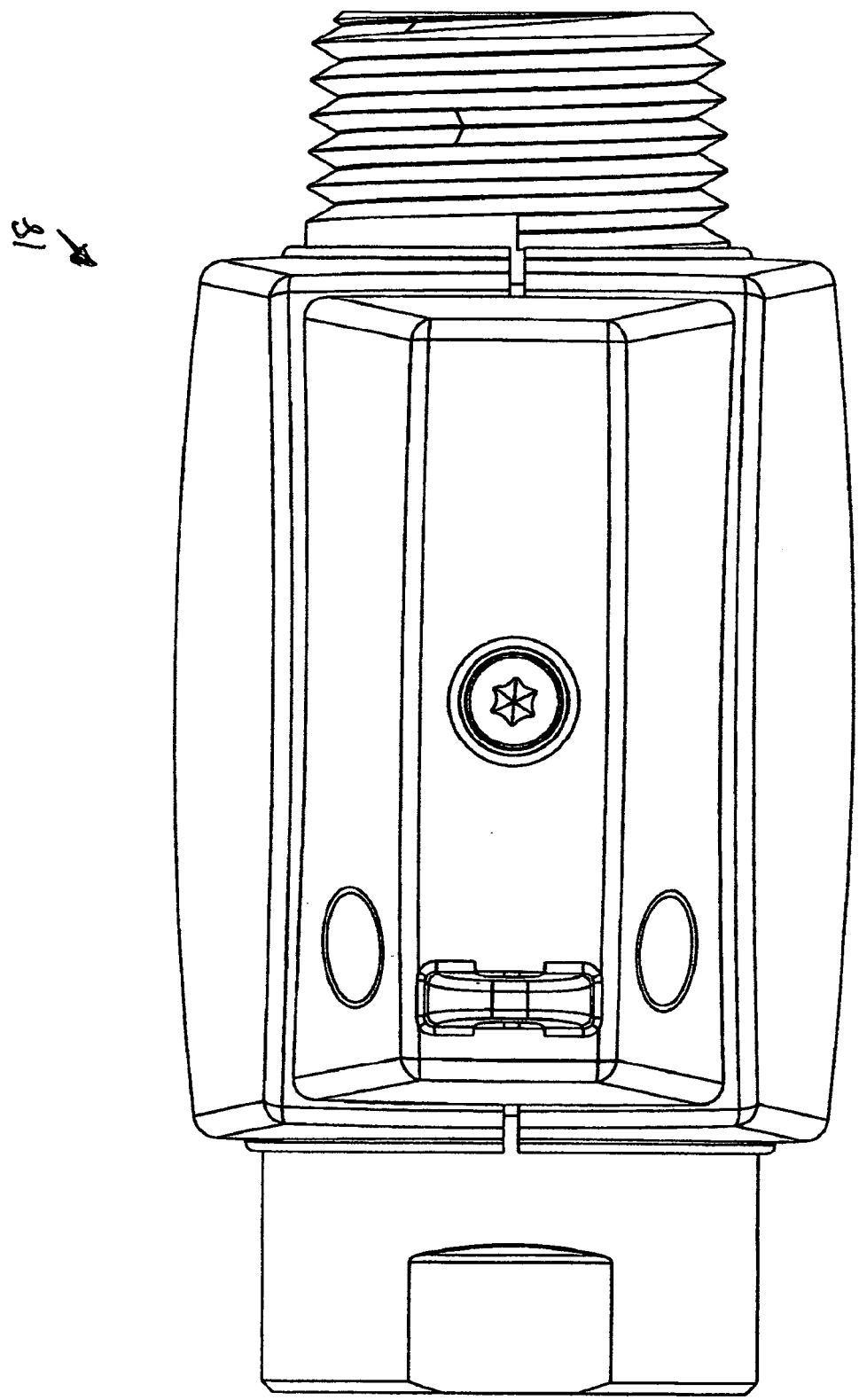
FIG. 2B is an external side elevational view of the valve assembly.

Left in the condition as illustrated in FIG. 2A, that is, with override locked out or disengaged, the only way water will resume flow is subsequent cooling (allowing hose to retract) which will allow piston spring 812 to move piston 814 and uncover slide ports 808E, allowing flow to resume through the hollow section of slide body 808D and piston 814, and out through outlet port 802A and body rear 802.

Figure 3A:
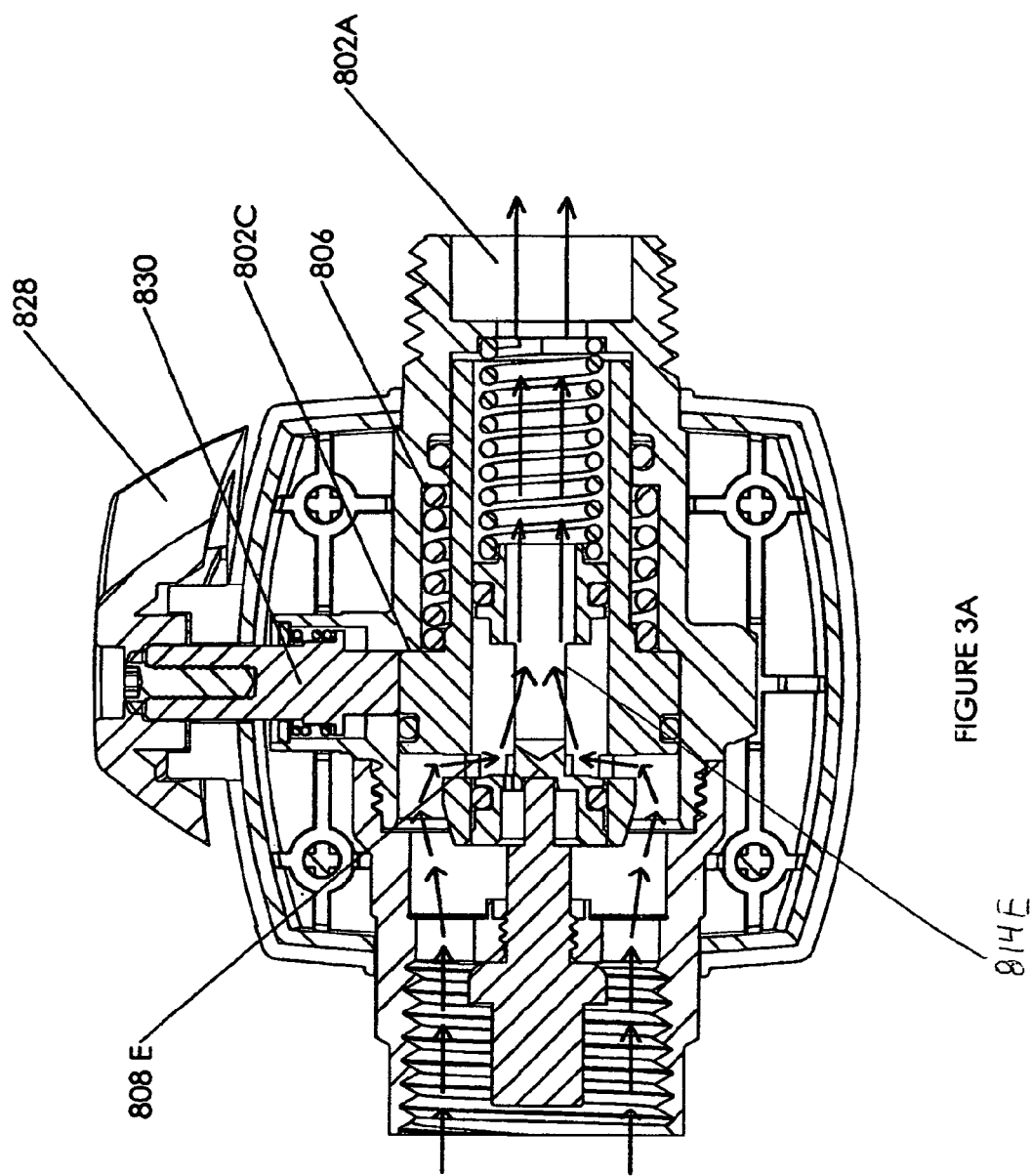
FIG. 3A is a sectional top elevational view of the valve assembly showing with arrows the water flow.
Figure 3B:
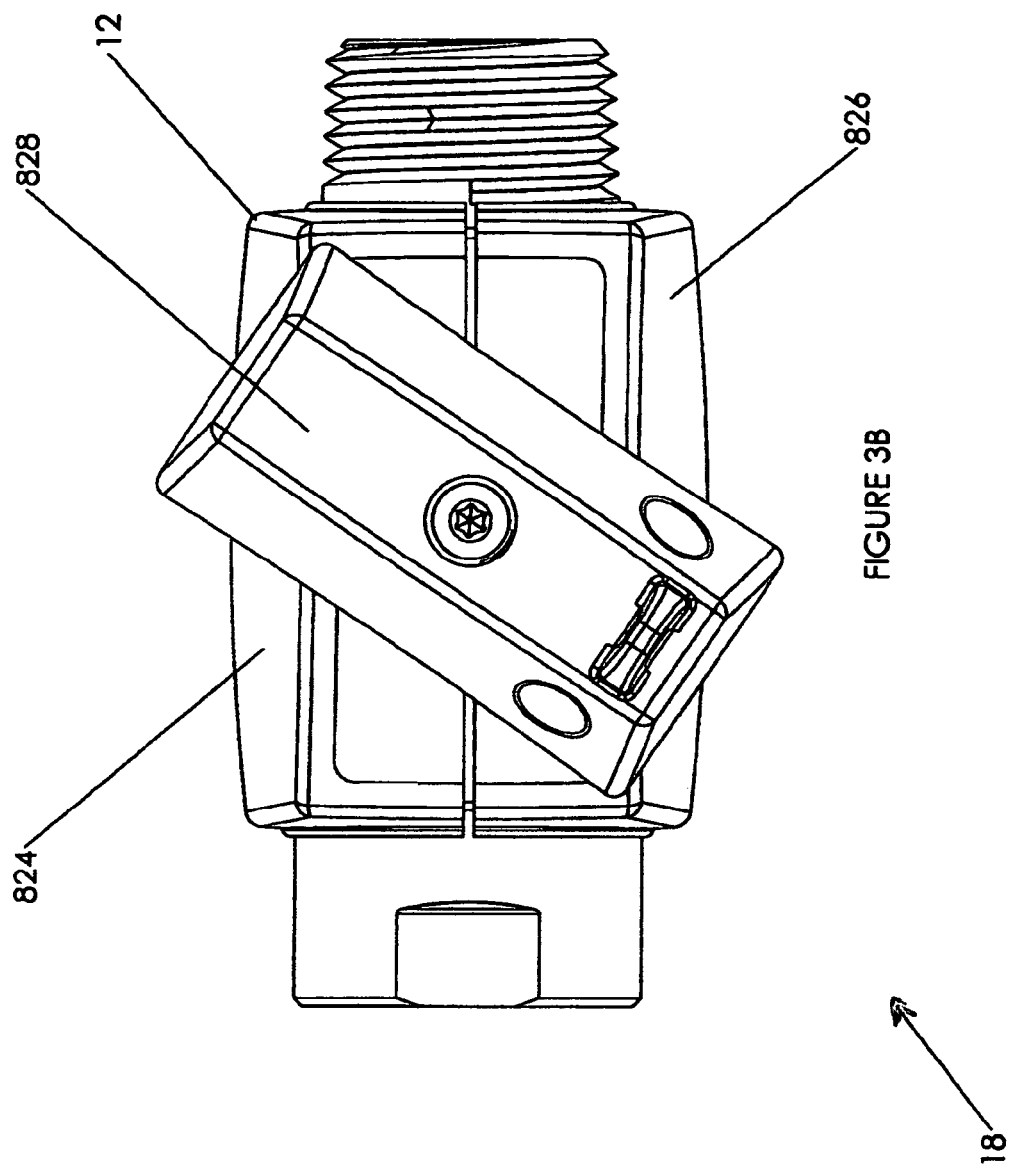
FIG. 3B is an external side elevational view of the valve assembly.
Figure 4:
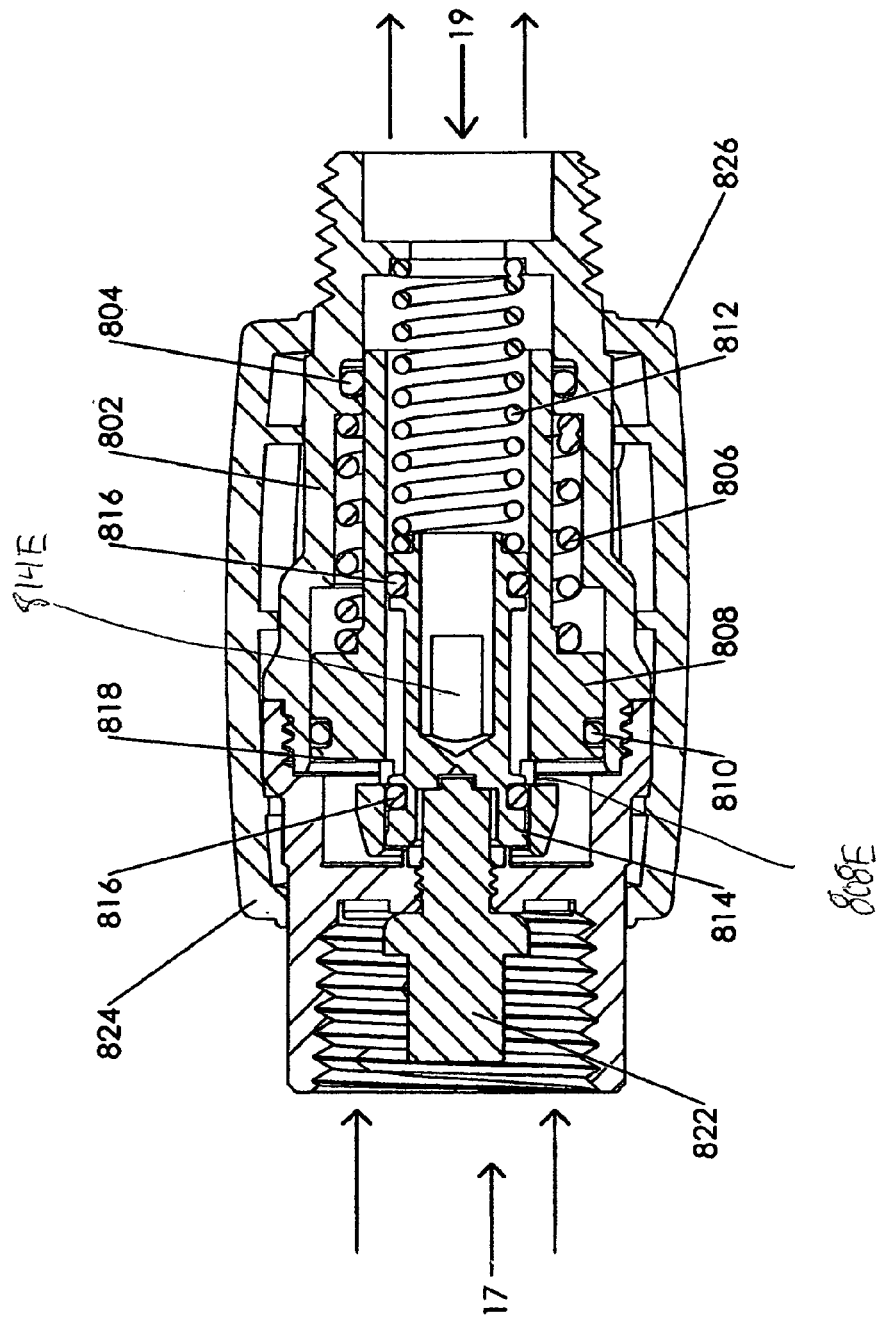
FIG. 4 is a sectional elevation side view of the valve assembly.

FIGS. 3A and 3B illustrate the novel valve assembly 18 after the user has elected to manually rotate handle 828, so as to withdraw release pin 830 from the rear of slide head 808B. Upon movement of the handle as seen in FIGS. 3A and 3B, the movement of slide 808 under the impetus of water pressure upstream of slide head 808B will overcome the pressure exerted by slide spring 806 and move the slide downstream and against annular stop lip 802C in body rear 802. This movement will uncover slide ports 808E and allow water (as well as water above the cutoff temperature) to resume flow through hollow sections of piston 814 and slide 808 and out outlet port 802A.

The user can adjust the water mix to the desired temperature above or below the cutoff temperature when in the bypass engaged condition illustrated in FIGS. 3A and 3B. When the user is through with showering, the user will simply shut off the mixing valves which are typically upstream of valve assembly 18. At this point (no/low water flow), slide spring 806 will allow slide 808 to move to the left or "upstream." When slide head 808B abuts shoulder 820A, release pin 830 under the impetus of release pin spring 832 will move to the lockout position as illustrated in FIGS. 1A and 1B, thus automatically resetting the override to a pre-override position. While the drop in hydraulic pressure allows the slide to move up to the pre-override position, other mechanical or electrical means may be used to achieve this function, including direct mechanical engagement with the mixing valves or position/pressure sensors combined with actuators to move the slide.

Figure 5A:
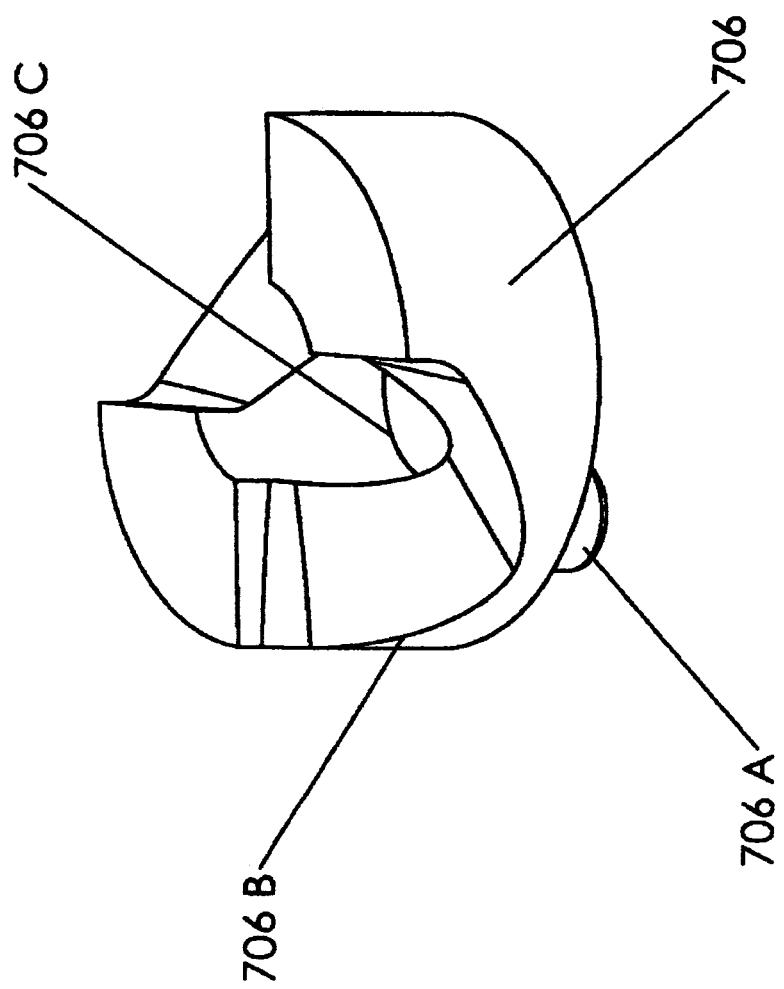
FIG. 5A is a perspective view of the cam used with the valve assembly.
Figure 5B:
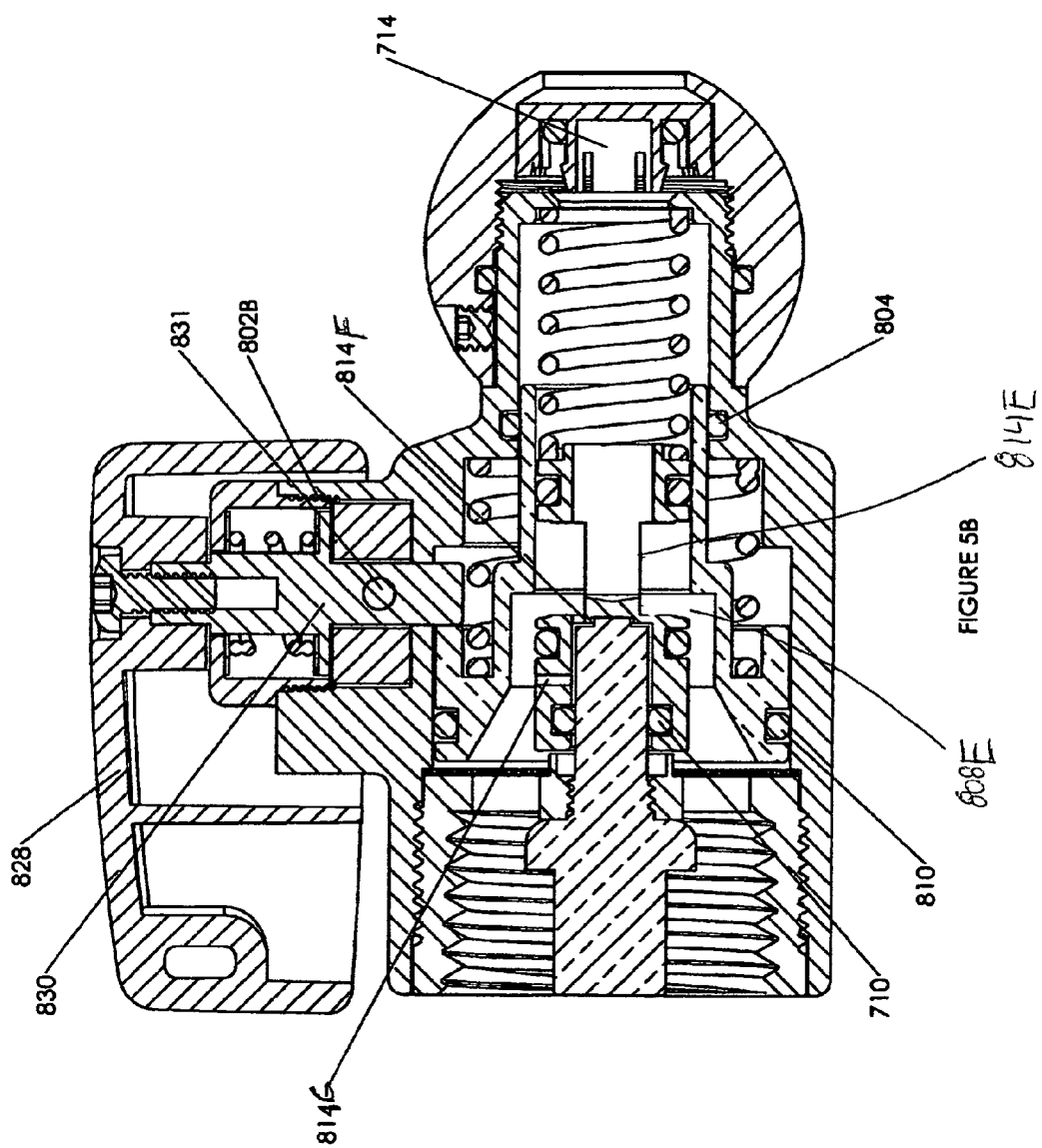
FIG. 5B is a sectional top elevational view of the valve assembly showing the override assembly in lockout or disengaged position.

FIGS. 5 and 5B illustrate an additional embodiment of the device as set forth herein which has some additional and/or different features. Further, FIG. 5, given that it is a cross-sectional perspective view, will help further illustrate the structure of some of the elements of the invention shown in the earlier Figures.

FIG. 5 illustrates the manner in which body front 820 includes threaded walls 820C, which allow secure engagement with actuator 822. Screen 818 may be sandwiched between body 820 and main body rear 802 to provide for filtering of water passing through the valve assembly.

Figure 5C:
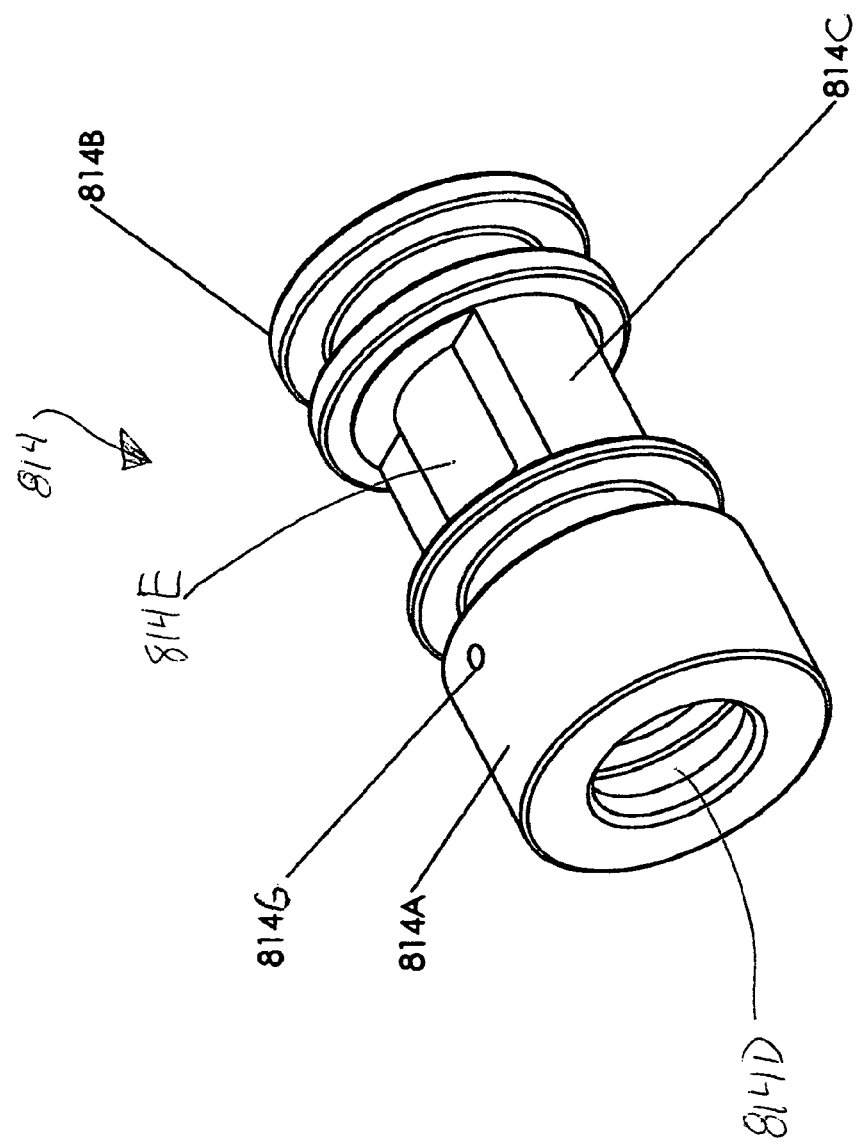
FIG. 5C is a perspective view of the piston used with the valve assembly.

Whereas, FIG. 1 illustrates a pair of O-rings 816 fitted by compression to grooves in outer walls of piston 814, it is seen with respect to FIGS. 5 and 5C that a piston gland O-ring 710 may be provided fittable to a groove on the inner walls of piston head 814A. Gland O-ring 710 will make contact with the actuator nose 822B as seen in FIG. 5B. Thus, it is seen the embodiment illustrated in FIGS. 5 and 5C has a piston with three O-rings, two on the outside and one gland O-ring on the inside to contact the actuator. The two on the outside will be maintained in their groove under compression and will contact the inner walls of the slide as seen in FIGS. 1, 1A, and 5B, for example.

The use of the gland O-ring 710 is to help seal off water, the use of the three O-rings, including the ones at the ends of the piston, will help provide a "cushion" and a "drag" that will provide dampening and thus help reduce the likelihood from "hammering" that may occur.

Details of a release assembly, whose function it is to release slide 808 and therefore activate the bypass or override function as seen in FIGS. 3A and 3B are seen to include: handle screw 836 for engaging handle 828 and extending therethrough to engage release pin threaded portion 830C of release pin 830. Pin cylinder cap 700, having cap threaded area 700A, screws into a threaded area on release pin housing 802B of body rear 802. With this, it can be seen that the release pin spring 832 will act on release pin land 830B. Thus, in the valve assembly, a release pin actuated by a handle, the release pin having cam pin 831, will always urge release pin 830 towards an engaged or interference position as illustrated in FIGS. 5 and 5B. It is seen that release pin 830 has a hole 830D in release pin arm 830A to receive cam pin 831 (shown in FIG. 5B) and would be perpendicular to release pin arm 830A and extend through the hole 830B. As seen in FIGS. 5 and 5A, cam 706 is insertable into release pin housing 802B and has boss 706A that will seat into the hole 802G slots in the base of release pin housing 802B. Central opening 706C in cam 706 is dimensioned to allow arm 830A to extend through the cam and through opening 802E in the base of release pin housing 820B, so as to be capable of reaching the position which locks out the override (FIGS. 1A, 2A, and 5B).

FIGS. 5, 5A, and 5B also illustrate curved portion 706B of cam 706, which allows cam pin 831 to ride up the curved portion against pressure of release pin spring 832 when the handle is rotated. Riding up from the position seen in FIG. 5B will allow release pin arm 830A to withdraw from the interference or lockout position, and "release" to allow the override or bypass to engage. Note that even in position with the override engaged (FIG. 3A), release spring 832 is urging release pin arm against the outside walls of slide head 808B, so as soon as the slide moves forward (responsive to the mixing valves being shut off, for example), the release pin arm 830A will automatically engage the rear of the slide head 808B (FIGS. 1A, 2A, and 5B) to lock out the override.

FIG. 5B illustrates an embodiment of piston 814 with two small channels 814E and 814F in piston head 814A that will allow water to trickle through the valve even when it is in an off position. This will help prevent cross-flow on worn mixing valves and acts as a hydraulic dampener to prevent "hammering." It is seen from FIG. 5B that, if the piston moved to a port flow blocking position, channels 814E and 814F would provide for the trickle flow of water through the valves. Further, the effect of gland O-ring 710 against the actuator nose combined with the two small channels 814E and 814F provides a "piston pump" hydraulic action to help prevent by dampening to potential hammering. The piston base 814B helps stabilize the piston in the slide and also helps prevent hammering.

FIG. 5 also illustrates the use of a flow restrictor 714 here designed to limit the flow to about 2.5 gallons per minute under typical pressures, as may be found in valves when the mixing valves are open and the valve is allowing water to flow therethrough. The position of the flow restrictor is typically downstream of the main body and the control elements of the valve.

FIG. 5 is also seen to include a ball 716 for engagement with main body rear 802 with, for example, the use of threads. Ball 716 will allow rotation with elements downstream thereof, for example, as set forth in FIG. 5B.

Figure 6:
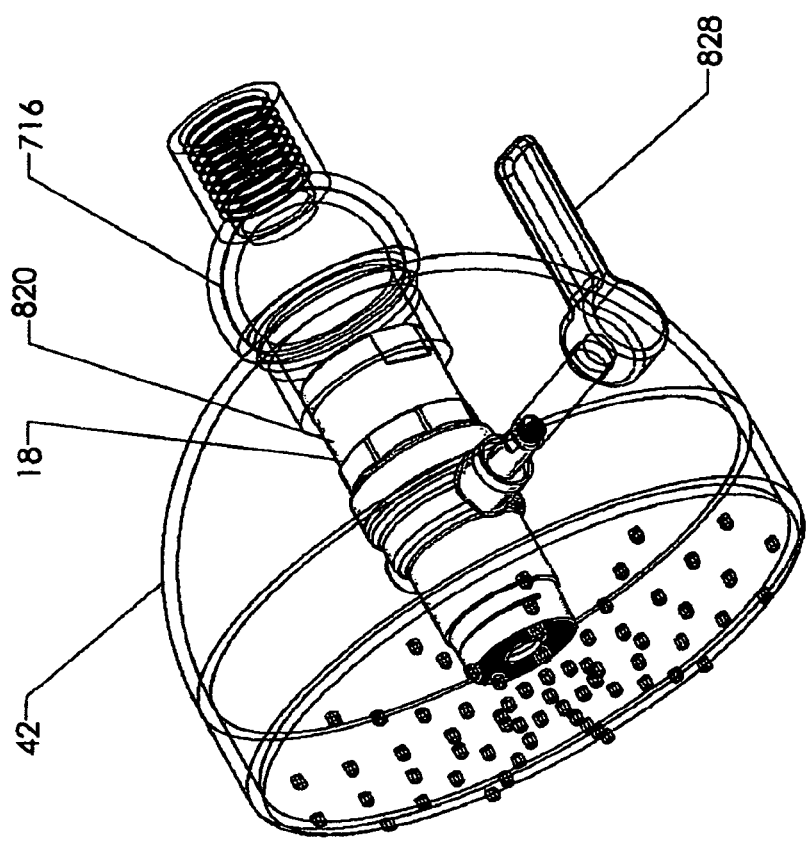
FIG. 6 is an elevational view of the valve assembly integrated with a showerhead.

FIG. 6 shows valve assembly 18 with ball 716 on the upstream end and attached to body front 820 by threadable means. Thus, ball 716 may be utilized on either the upstream or downstream end of the body.

FIG. 6 also illustrates the use of the valve inside a custom showerhead 42. In this embodiment, housing parts 824/826 may be omitted. The valve, except the handle, may be enclosed within the body of the showerhead, forming an integrated showerhead/valve unit.

Figure 7:
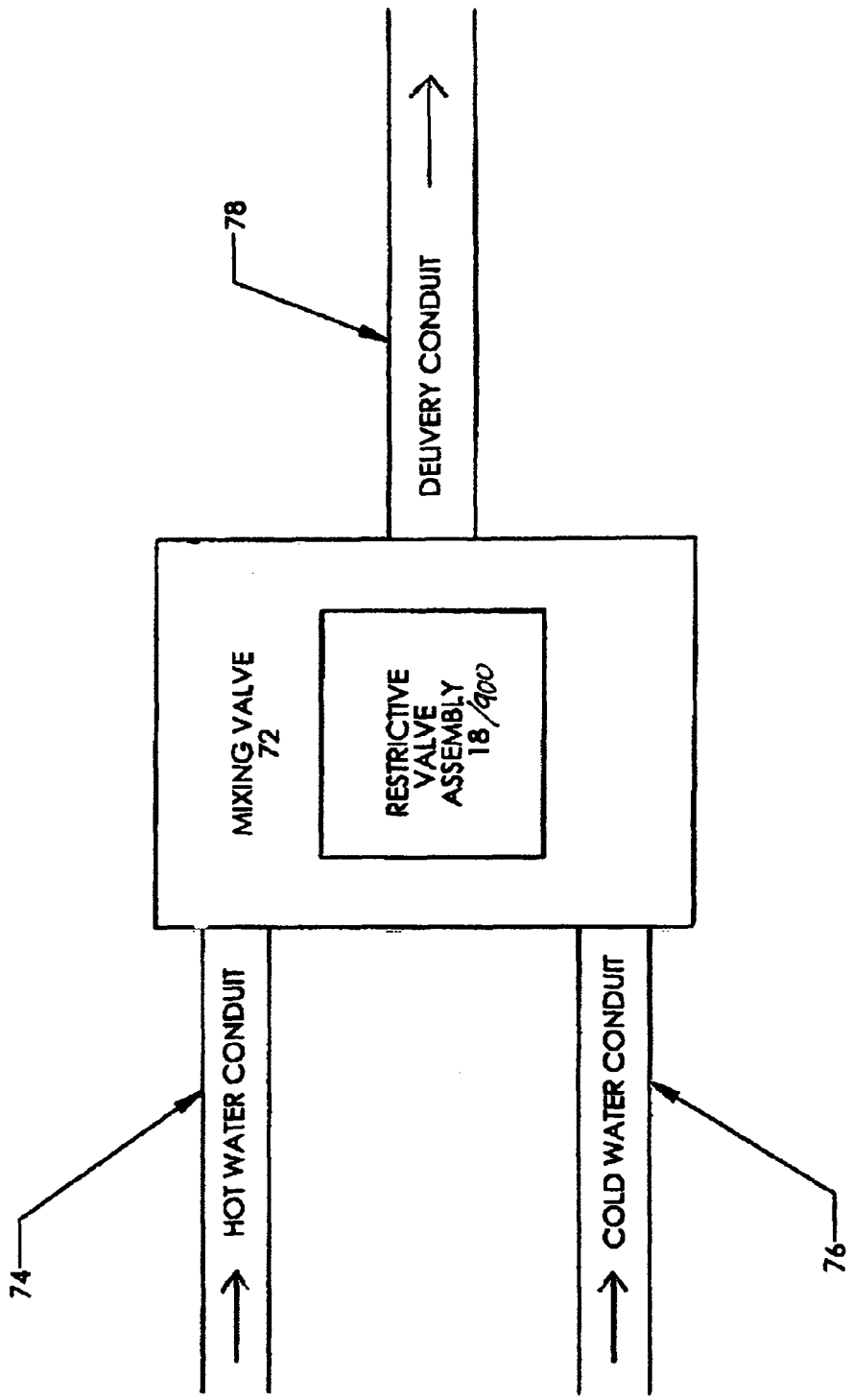
FIG. 7 is an illustration of Applicants' valve assembly integrated with a mixing valve or valves.
Figure 8:
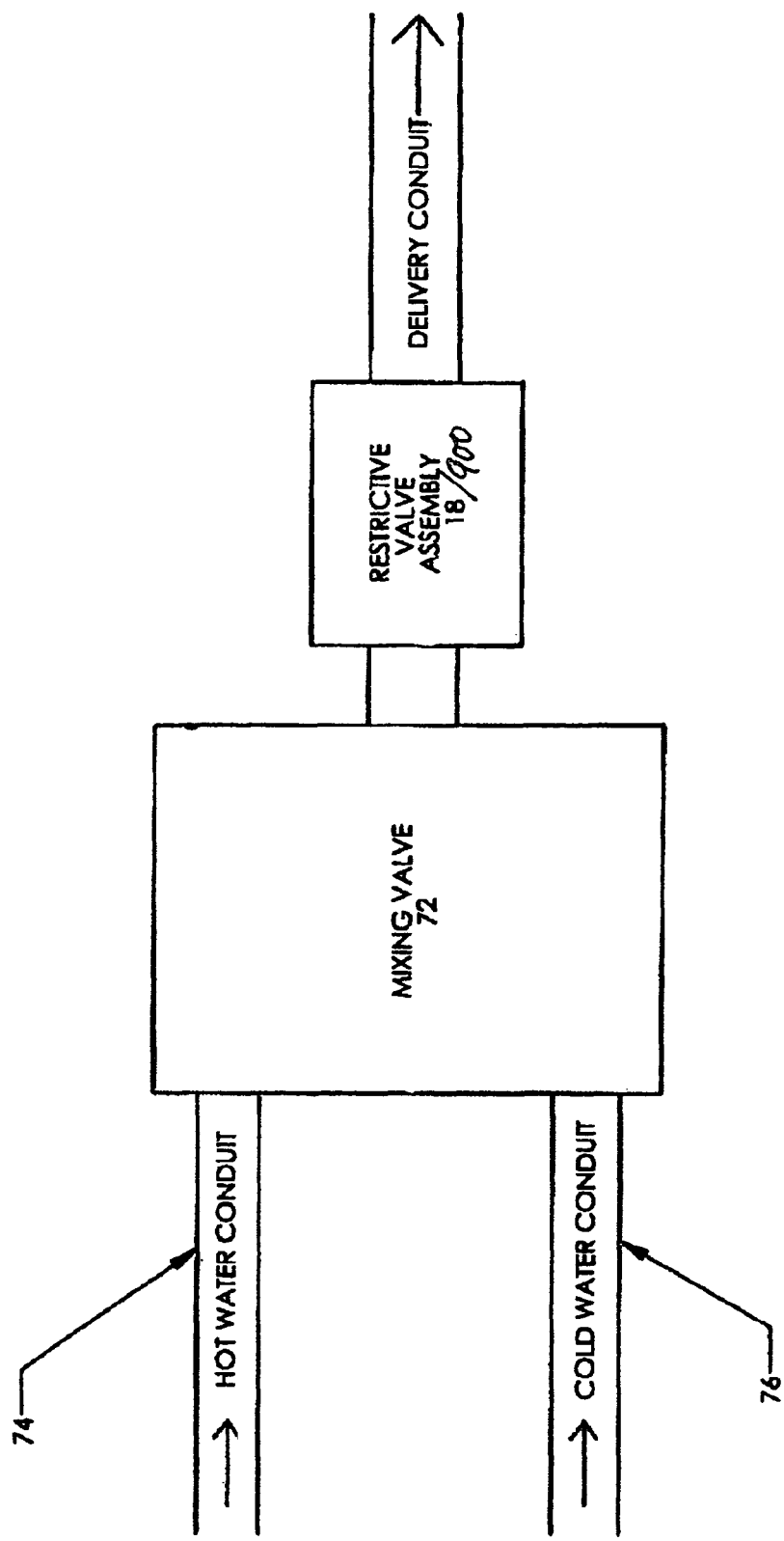
FIG. 8 is an illustration showing the use of Applicants' valve assembly downstream of mixing valves.

FIGS. 7 and 8 illustrate the use of Applicants' novel valve assembly 18 in a larger environment as part of a water flow control system. FIG. 7 illustrates that the novel valve assembly 18 may be physically incorporated into the same housing as the mixing valves or valves 72. Mixing valve 72 would typically receive water from a hot water conduit 74 and a cold water conduit 76. Integrated within the same assembly housing as mixing valves which control the amount of hot and cold water coming into a single delivery conduit 78, may be the restrictive valve assembly 18.

On the other hand, as seen in FIG. 8, Applicants' valve assembly 18 may be downstream from mixing valve 72 and in line with a delivery conduit 78. In FIG. 8, it is seen that valve assembly 18 is downstream of a mixing valve and upstream of a showerhead (not shown).

Figure 8A:
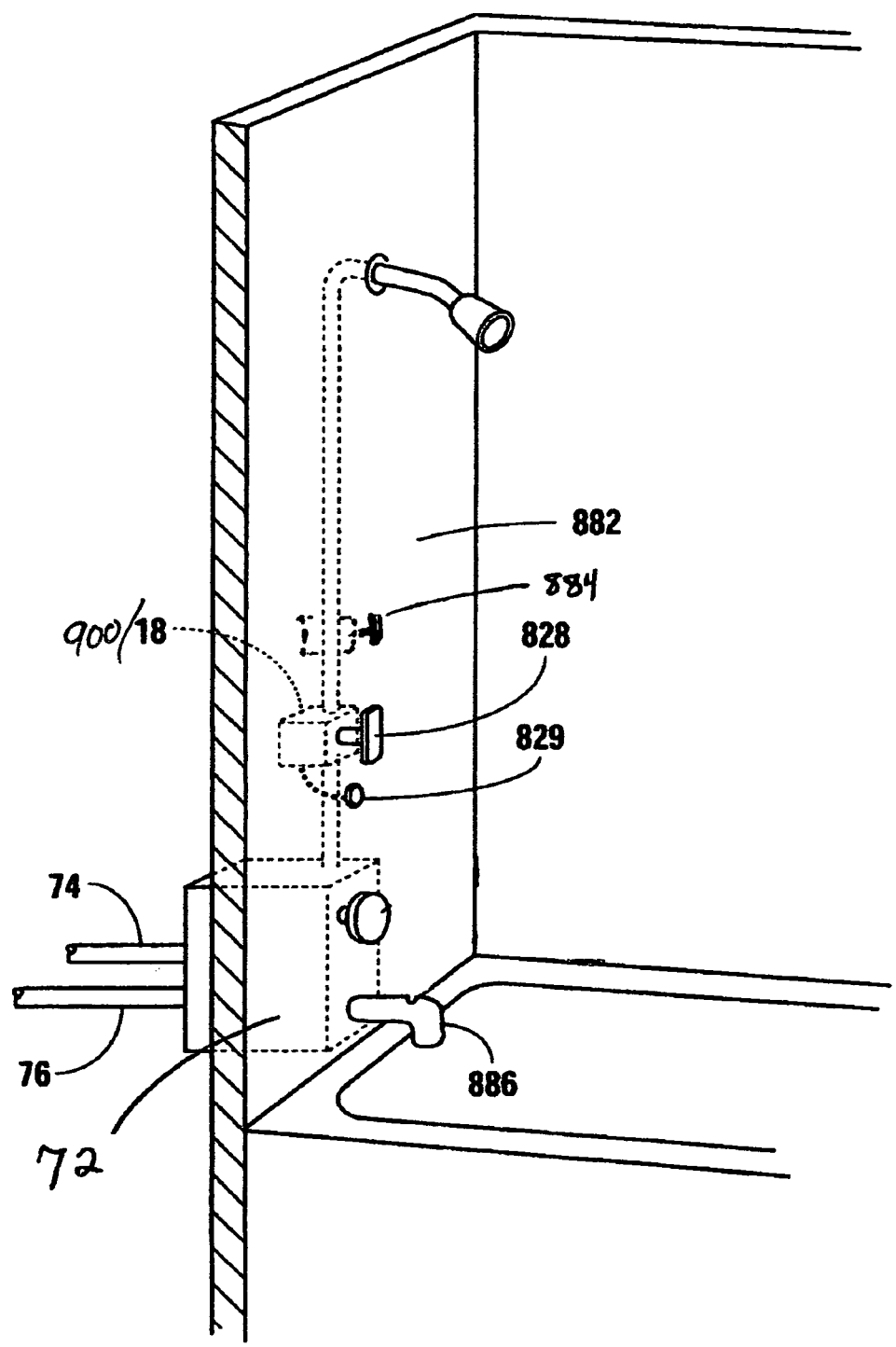
FIG. 8A is an illustration of Applicants' valve assembly as part of a larger flow control system, including a wall.

FIG. 8A illustrates Applicants' novel valve assembly 18 in a larger environment as part of a water flow control system. FIG. 8A illustrates that Applicants may provide a wall 882 to substantially isolate, from the user and the environment in which the user will bathe, elements including mixing valve 72 excepting handle, which would be exposed through wall 882 for manual manipulation by the user. Mixing valve or valves 72 are known in the art for receiving water from cold water conduit 76 and hot water conduit 74. Applicants' water flow control system may include a diverter valve 884 downstream, typically, of valve assembly 18, for example, to divert water from a showerhead flow or a tub faucet flow.

The embodiments illustrated (see, for example, FIGS. 1 and 5), show that Applicants' temperature sensing mechanism, for example, actuator 822, is advantageously, but not necessarily, placed in the most upstream position so a to better respond to temperature changes and avoid the heat sink effect of elements downstream of the actuator. Further, it is seen that Applicants' sensor is pushing the piston in a downstream direction as it expands, that is, pushing in a direction that is assisted by the water pressure, moving the piston, as illustrated in the drawings from left to right. Actuator 822 is, in one embodiment, a wax actuator adapted to respond by expanding in a range of approximately 90.degree. F. to 110.degree. F., such as an actuator manufactured by Vernet as Model Nos. A034 and A092/P. Element 822 both senses temperature changes and responds, as by expanding or contracting to such change. The sensing and actuating functions may be achieved through separate elements however. Other temperature actuators/sensors, such as a temperature responsive memory wire, a bimetallic element, or other known and appropriate temperature responsive phase change materials, or electromechanically operated temperature sensors may be used in conjunction with Applicants' novel valve assembly, such as those known in the art.

As seen with reference to the Figures, the slide will typically have an upstream slide head area that is responsive to water pressure in urging the slide to a downstream direction. Likewise, the piston typically would have an area exposed to water pressure upstream that would tend to move it to a downstream position. In Applicants' novel valve, such area on the slide here seen to be an annular ring, is significantly larger than the piston head area.

While the grasping member to the release of the override feature is illustrated to be a handle, the override feature may be actuated with a lanyard, chain, electronic button, switch and optical or other sensor. Moreover, a visual/audible indicator 829 (see FIG. 8A) may be used to indicate that the shower is ready (that is, when the temperature actuator has restricted the flow of water). Indeed, a visual or audible "reminder" may be used, including a popout indicator or a constant or blinking light. Temperature or pressure actuated visible or audio indicators may also be used.

FIGS. 1 and 5B illustrate the use of a gland O-ring 804 situated and engaged with the body walls near the downstream end of slide 808 when the slide is in its upstream most position. O-ring 810 is seen to engage the slide head. The use of a gland O-ring will "swipe" the slide along with its position at the downstream end of the slide helps, among other things, decrease mineral deposits buildup on the slide. O-ring 810 will swipe the channel walls of the body when the slide moves. The use of the O-rings in these positions helps prevent drying out which tends to create scale and scale tends to impede the proper effective operation of the elements. Between these O-rings, a lubricant, such as a silicon based lubricant, is provided to keep the channel and slide walls lubricated.

As is illustrated, Applicants' novel valve may be located in between the shower arm and the showerhead using matching threads. It may also be incorporated into the showerhead. Applicants' novel valve assembly may be retrofittable to many shower arms by removing existing threaded showerheads and inserting in the space between the showerhead and the end of the shower arm, Applicants' novel valve and threading the showerhead to the downstream end after threading the valve into the end of the threaded end of the shower arm. The valve may also be built into the shower arm or shower stall/tub walls (see FIG. 8A).

Referring now to FIG. 9 there is shown another preferred embodiment of the present invention depicted as valve 900, wherein like numeral refer to like elements. Valve 900 is seen to comprise of a body front 902 threadably received into the proximal end of main body 904 whereby an upstream port is defined at a proximal opening of front body 902. Axially disposed in a central cavity of main body 904 is seen a stationary sleeve 906 having a slidable piston 908 axially disposed therein. Piston 910 has a recessed middle portion 908 defined between a pair of O-rings 910 and forming an annular fluid passageway 912 between the piston middle portion 908 and the opposing inner wall of sleeve 906, as shown. A fluid passageway 914 is defined between the outer surface of sleeve 906 and the inner wall of main body 904. The sleeve 906 has a first set of openings extending therethrough communicating the piston fluid passageway 912 with the sleeve passageway 916. The sleeve 906 further includes a second set of openings 918 extending thru the sleeve wall 908 distal of openings 916, and a third set of openings 920 extending thru the sidewall thereof distal openings 918. An annular passageway 922 is defined between the sleeve body 906 and the main body 904 at a distal end of sleeve 906 and which is in fluid communication with openings 920. An O ring 924 is provided in an annular raised portion 926 of the sleeve 908 providing a fluid seal between the sleeve 906 and the main body 904. This annular raised portion of sleeve 906 is defined between the second set of openings 918 and the distal third set of openings 920, as shown.

The temperature sensitive actuator 822, as previously described, is axially disposed through sleeve 906, and the actuator nose 822B engages a distal end of piston 908, as shown. An actuator spring 930 is disposed about actuator nose 822B, and creates a spring force between an actuator nose cap 932 and the inner distal wall of piston 908 as shown. A plurality of openings 934 are defined through a proximal end of sleeve 906 and provides fluid communication from the upstream port to the fluid passageway 914 about sleeve 906 as previously discussed. A fluid screen 936 is disposed across openings 934 as shown. Piston spring 806 is seen to be axially positioned within main body 904, and engages an anterior shoulder 940 of main body 904 as well as an annular shoulder 942 of piston 908. Piston spring 806 is configured to resist the distal advancement of piston 908, and urge the piston 908 back to its first position, as shown in FIG. 9, when fluid pressure is removed from the upstream port. However, piston spring 806 permits the piston 908 to advance to its second position, as shown in FIG. 10, as the actuator nose 822B distally extends as fluid temperature increased.

Figure 11:
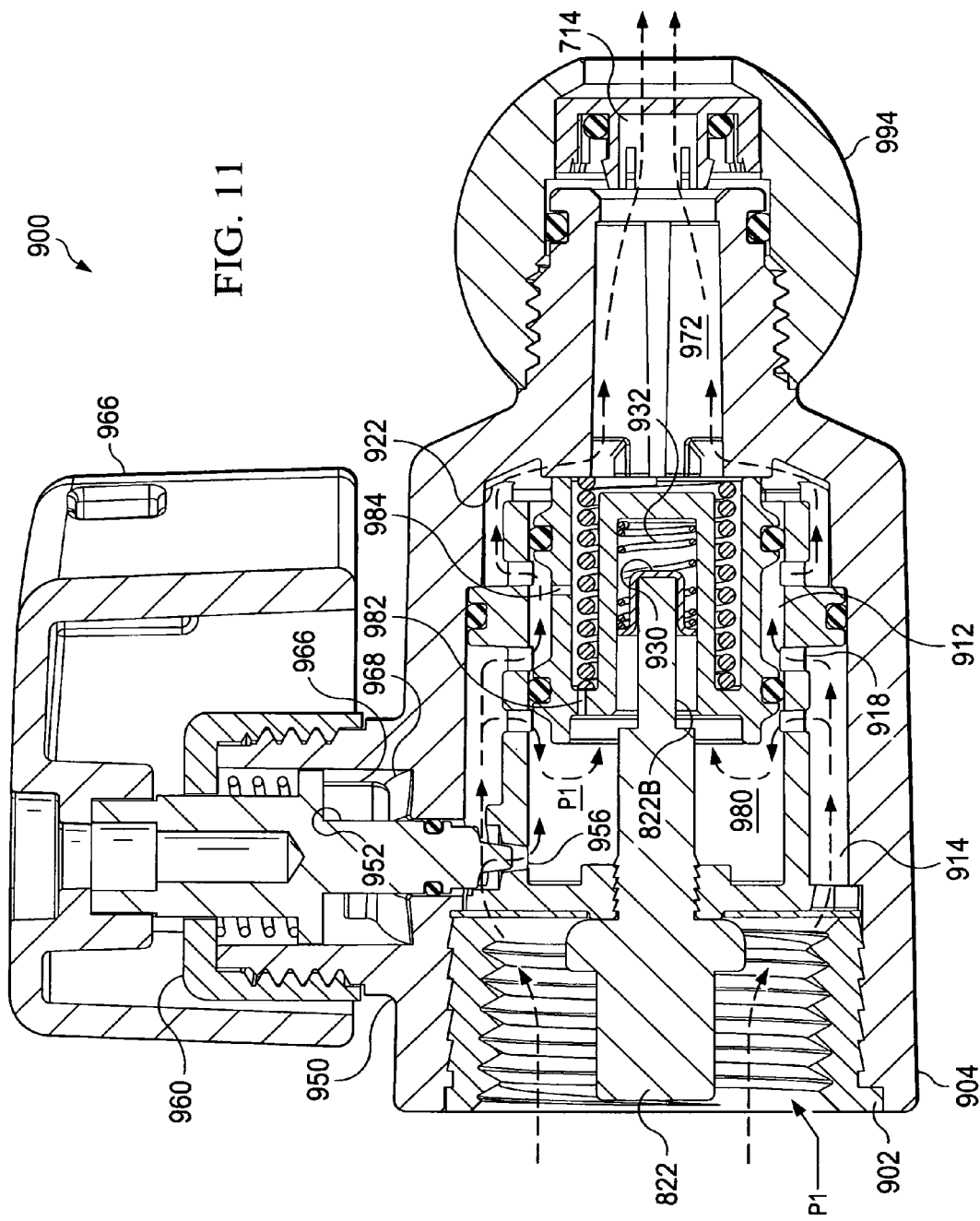
FIG. 11 is a cross sectional view of the embodiment shown in FIG. 9 whereby fluid pressure from the upstream port is communicated to the piston proximal end and advancing the piston to the third position whereby fluid flows therethrough.
Figure 12:
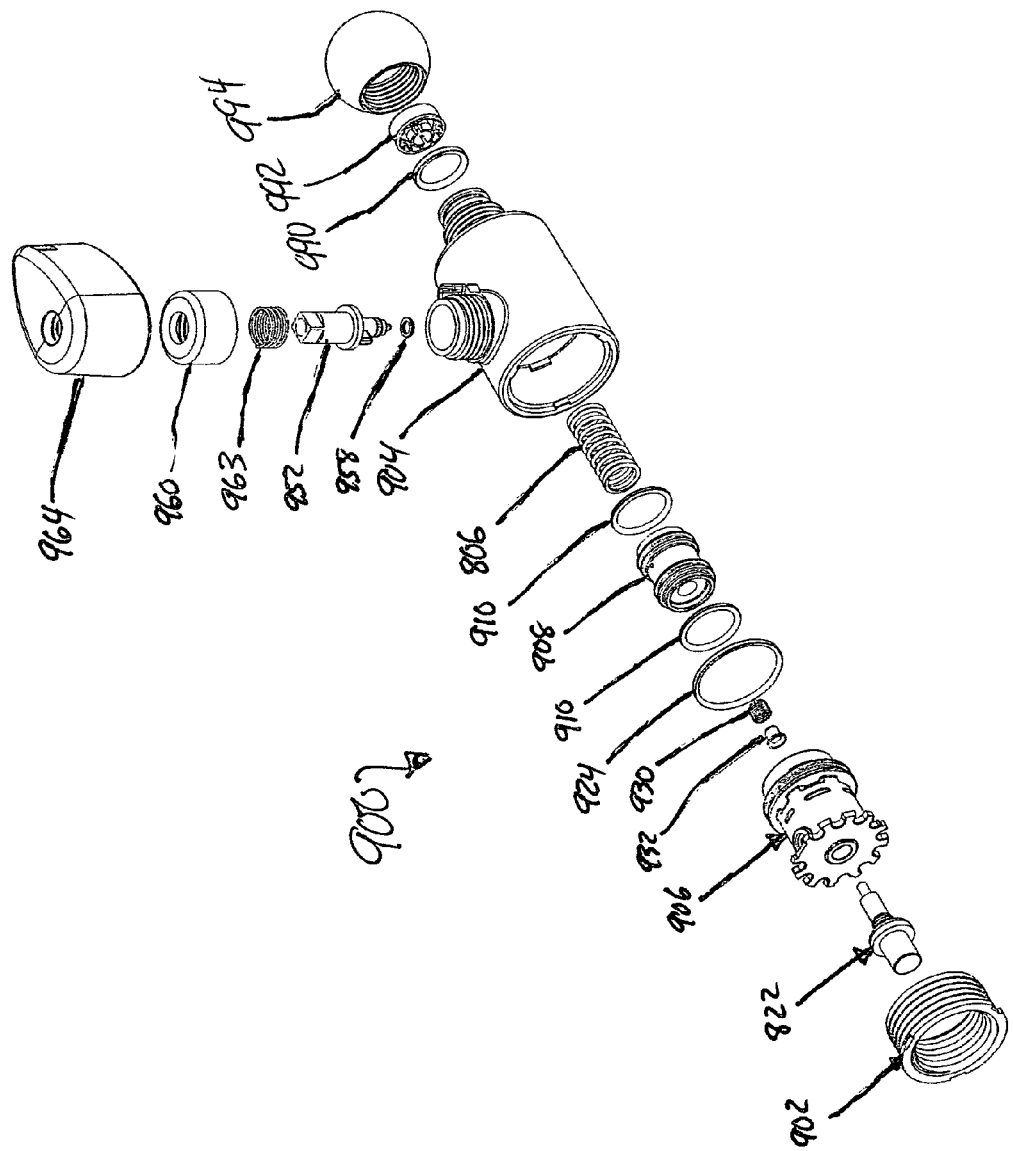
FIG. 12 is an exploded perspective view of the embodiment shown in FIGS. 9-11.

Main body 904 is seen to include a threaded extension 950 configured to receive a radially extending pin 952 extending through a main body opening 954, as shown. The pin 952 has a distal tip portion extending into a proximal sleeve opening 956, and has a seal ring 958 disposed about the pin tip 956 to provide a fluid seal thereabout. A handle collar 960 is threadably coupled to the extension 950 and has an opening configured to receive the pin 952. A fastener 962, such as a screw, secures the handle 964 to the pin 952. Handle 964 has a lever arm portion 966 configured to facilitate rotation of the handle and pin 952 to advance the piston to the third position as shown in FIG. 11. Main body 904 is also seen to have a threaded distal end threadably receiving an o-ring 990 disposed thereabout, a collar 992 and a ball member 994 secured thereabout so as to couple to a showerhead. The valve 900 may be positioned in a hot/cold water mixing valve to create a unitary structure as shown in FIG. 7.

Valve 900 is configured to operate in three positions, with the first position being shown in FIG. 9. In this first position, the piston 908 is positioned at a proximal end within sleeve 906, and fluid is permitted to flow from the upstream port to the downstream port 714 as shown by the arrows depicting fluid flow. Specifically, fluid is permitted to flow from the upstream port through the sleeve openings 934 into sleeve passageway 914, through the intermediate openings 918 into a sleeve cavity 970, back through the distal openings 920, through annular passageway 922, behind the distal end of sleeve 906 and through distal passageway 972 to the downstream port 714. The first position depicted in FIG. 9 illustrates the free flow of fluid when the temperature of the fluid is below a predetermined temperature and the actuator nose 822B is retracted, as shown. The fluid pressure at the upstream port, depicted as P1, provides the pressure creating the fluid flow therethrough. It is noted that this pressure P1 is also communicated to the piston passageway 912 and thus there is no differential pressure between the piston flow passageway 912 and the distal sleeve passageway 970.

Figure 10:
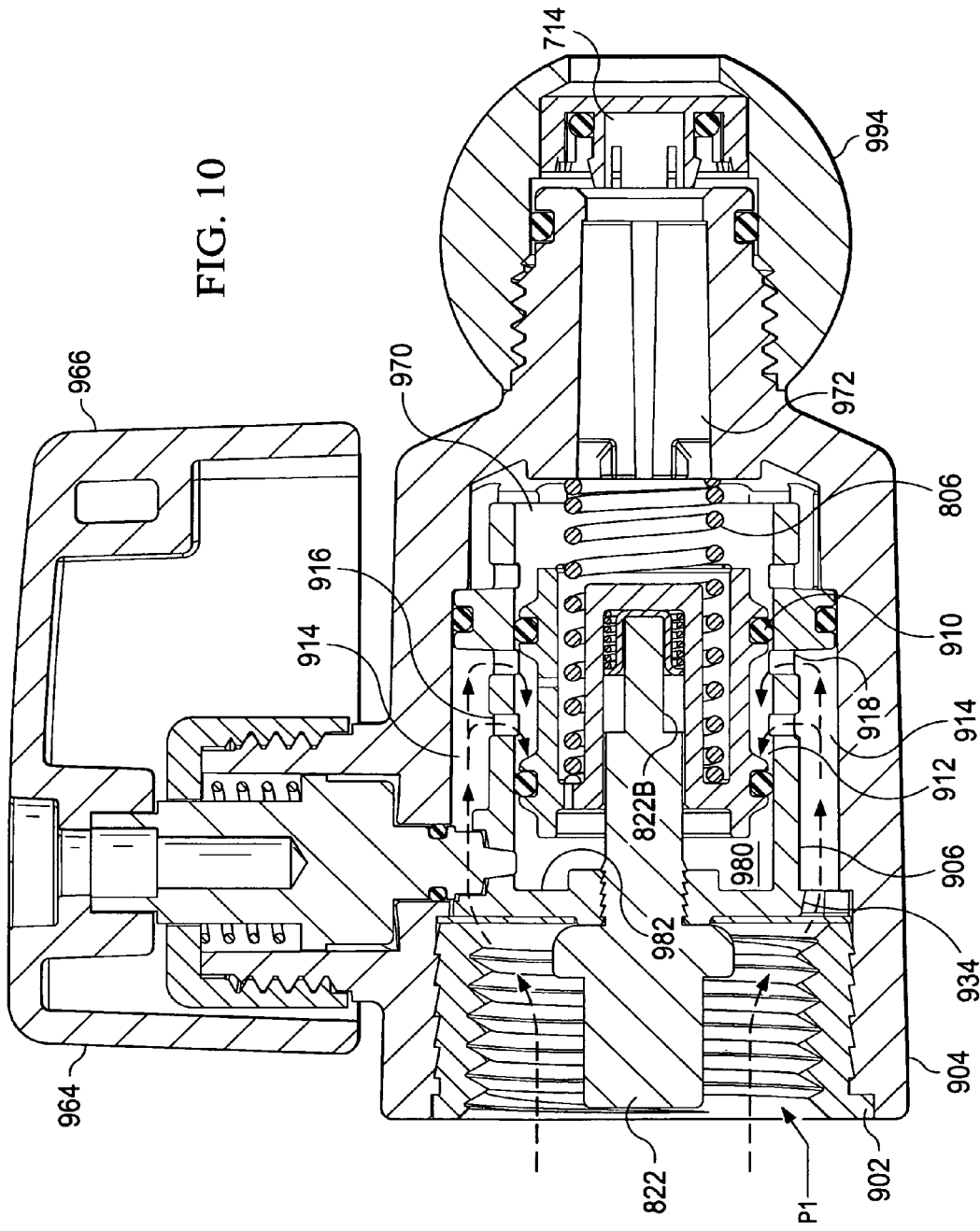
FIG. 10 is a cross sectional view of the embodiment shown in FIG. 9 with the piston in the second position and no fluid pressure provided to the proximal end, wherein fluid flow is restricted.

Referring now to FIG. 10 there is shown a second valve position whereby the fluid flow has reached the predetermined temperature causing the actuator nose 822B to responsively extend the piston 908 to the second position. In this second position, the distal piston O-ring 910 provides a liquid seal distal of the intermediate openings 918 such that fluid cannot flow past the piston 808 to the downstream port 714. Rather, fluid is communicated from the upstream port through proximal sleeve openings 934 to sleeve passageway 914 and through both openings 916 and 918 and terminating within piston passageway 914 as shown. Of note is that no fluid pressure P1 is provided to a cavity 980 defined between the piston 908 and a proximal wall 982 of the sleeve 906. In the second position, the actuator nose 822B is at its maximum distal position and thus the piston 908 does not extend distally further than the position shown in FIG. 10. There is also no fluid pressure in sleeve chamber 970, and thus there is no differential pressure across the piston 908 between sleeve passageway 970 and sleeve cavity 980. However, the pressure P1 is provided about the piston 908 to the fluid passageway 912 and between the pair of piston O-rings 910. Hence, the only axially force on piston 908 is the biased force of piston spring j806. As seen, in this second position, the release pin 952 remains in its extended position and into sleeve opening 956.

Referring now to FIG. 11, there is shown a third position whereby the handle 964 is manually rotated to responsively retract the distal tip of pin 954 from the sleeve opening 956, permitting fluid and the pressure P1 from the upstream port to be communicated through opening 956 to the sleeve proximal chamber 980. By providing fluid and the fluid pressure P1 to be communicated to cavity 980, this fluid pressure P1 overcomes the piston spring force of spring 806, and the piston 908 responsively extends distally to a third position such that it engages body shoulder 940, as shown. When the piston 908 is in this third position, the fluid pressure P1 is also provided to sleeve passageway 914 the proximal openings 916 into chamber 980. The fluid is then permitted to flow through the valve 900 through the front body 902, openings 934, seal passageway 914, intermediate sleeve openings 918, piston passageway 912, distal sleeve openings 920, annular passageway 922, behind the distal end of sleeve 906 and piston 908, passageway 972 to downstream port 714. When piston 908 is in this third, distal piston, the differential fluid pressure across the piston 908 from chamber 980 to passageway 970 and 972 is almost nothing is negligible. Thus, when the piston 908 is in any of the three positions shown in FIGS. 9, 10 and 11, the differential pressure across the piston is negligible. Advantageously, this permits the piston 908 to be comprised of cheaper materials, including plastic, as it is not subject to significant forces that would otherwise require it to be comprised of a stronger, more expensive material such as a metal. Similarly, no slide spring is required, and thus the sleeve 906, the main body 904, the pin 954 and front body 902 can also all be comprised of cheaper and moderate strength materials, such as plastic. As shown in FIG. 11, the simple retraction of the pin 952 simply allows the pressure P1 to advance the piston 908, and the pin 952 is not required to experience or resist any other forces.

To reset the valve 900, fluid pressure simply removed from the upstream port, thus removing the pressure P1 from chamber 980, allowing the actuator 822 to cool such that the nose 822B retracts, and the piston 806 urges the piston 908 back to its first position shown in FIG. 9. The handle 960 can be simply rotated back to its normal position shown in FIG. 9 as well. It is noted that the handle 964 includes an extension 966 that rotatably engages a cam 968 such that the pin 952 is retracted when rotated as shown in FIG. 11.

Advantageously, the actuator pin 952 acts as a pressure relief for the valve, whereby if the valve is in position 2 where the water flow is essentially stopped and the mains pressure is very high (over 100 psi for example), the pin 952 acts against a pin spring 963 disposed thereabout. When pressure is high enough the pin 952 opens the actuation port and opens the valve, thus removing the pressure and protecting the valve. ASTM certification requires that this valve withstand 300 psi, and hence this arrangement advantageously allows the valve of the present invention to comprise of a cheaper plastic and yet meet the ASTM requirements.

Also shown in FIG. 11 is a small opening 982 operating as a piston port extending between chamber 980 and a piston recess 984 proximate piston spring 806 to allow a trickle flow of fluid thru the valve body. This piston port 982 allows the piston to retract after water flow stops. Otherwise, the valve would have a hydraulic lock condition. There is also shown the piston 908 having a small opening extending through its wall proximate the piston flow passageway 912 such that when the piston is in the second position, as shown in FIG. 10, a small leak flow of fluid is permitted from the upstream port to the downstream port as required by regulations.

Advantageously, the valve 900 has only one moving part, namely, the piston. Advantageously, the piston 908 is axially balanced, meaning that there is no significant differential pressure between the proximal end thereof and the distal end thereof in any of the three positions. These is a significant technical advantage since the piston and other valve elements can be made of less expensive materials, including plastic, yet withstand the significant pressure of fluid passing therethrough, even when the fluid flow is restricted. The piston is configured such that the piston seals 910 experience wear over time, and the springs 806 and 930 expand and retract during operation. The result is a highly reliable and inexpensive temperature controlled restrictive valve.

Though the invention has been described with respect to a specific preferred embodiment, many variations and modifications will become apparent to those skilled in the art upon reading the present application. The intention is therefore that the appended claims be interpreted as broadly as possible in view of the prior art to include all such variations and modifications.

What is claimed is:

1. A valve for controlling the flow of a fluid therethrough, comprising:
    a main body having a wall defining a channel extending therethrough between an inlet port and an outlet port;
    a sleeve axially disposed in the main body; and
    a piston having a proximal end and a distal end and axially disposed in the sleeve, the piston configurable in a first position whereby the fluid is permitted to flow from the inlet port through the valve, a second position distal the first position and established by a temperature sensitive actuator whereby the fluid is restricted from flowing through the valve, and a third position distal the second position whereby the fluid is permitted to flow from the inlet port through the valve, wherein a fluid pressure at the piston proximal end and the piston distal end piston is substantially balanced when the piston is in the second position.

2. The valve as specified in claim 1 wherein the fluid pressure at the piston proximal end and the piston distal end is substantially balanced in the first, second and third positions.

3. The valve as specified in claim 1 wherein substantially no fluid pressure at the inlet port is communicated to the piston proximal end when the piston is in the second position.

4. The valve as specified in claim 1 wherein a flow passageway is defined between the sleeve and the piston.

5. The valve as specified in claim 4 wherein the flow passageway is configured to selectively allow fluid flow therethrough.

6. The valve as specified in claim 5 wherein fluid at the inlet port is configured to flow about the piston and through the flow passageway when the piston is in the third position.

7. The valve as specified in claim 5 wherein fluid at the inlet port is not configured to flow about the piston and through the flow passageway when the piston is in the second position.

8. The valve as specified in claim 5 wherein fluid at the inlet port is not configured to flow about the piston and through the flow passageway when the piston is in the first position.

9. The valve as specified in claim 4 wherein the sleeve has a sleeve wall comprising at least one opening therethrough and in fluid communication with the flow passageway.

10. The valve as specified in claim 9 wherein the piston forms a fluid seal with the sleeve each side of the sleeve opening.

11. The valve as specified in claim 1 further comprising a spring biasing the piston toward the first position.

12. The valve as specified in claim 1 wherein the temperature sensitive actuator comprises paraffin wax, configured such that the temperature sensitive actuator is configured to urge the piston distally when heated.

13. The valve as specified in claim 12 wherein the temperature sensitive actuator is disposed in a proximal portion of the piston.

14. The valve as specified in claim 1 further comprising a selectively movable member configured to permit the piston to extend from the second position to the third position upon movement of the member.

15. The valve as specified in claim 14 wherein the member is configured to permit a fluid pressure at the inlet port to be communicated to a proximal end of the piston upon movement of the member.

16. The valve as specified in claim 15 wherein the fluid pressure at the proximal end of the piston is configured to move the piston from the second position to the third position.

17. The valve as specified in claim 14 wherein the sleeve comprises an opening configured to communicate fluid from the inlet port to the piston upon movement of the member.

18. The valve as specified in claim 1 further comprising a spring disposed between the piston and the temperature sensitive actuator.

19. The valve as specified in claim 1 wherein the valve is disposed in a hot/cold water temperature mixing valve.

20. A valve for controlling the flow of a fluid therethrough, comprising:
a main body having a wall defining a channel extending therethrough between an inlet port and an outlet port;
a member axially disposed in the main body; and
a piston having a proximal end and a distal end and axially disposed in the member, the piston configurable in a first position whereby the fluid is permitted to flow from the inlet port through the valve, a second position distal the first position and established by a temperature sensitive actuator whereby the fluid is restricted from flowing through the valve, and a third position distal the second position whereby the fluid is permitted to flow from the inlet port through the valve, wherein a flow passageway is defined between the piston and the member and configured to permit fluid to selectively pass therethrough.

21. The valve as specified in claim 20 wherein the flow passageway is configured pass fluid only when the piston is in the second position.

22. The valve as specified in claim 21 wherein a differential pressure across the piston is balanced when the piston is in all three positions.

23. The valve as specified in claim 22 wherein a fluid pressure across the piston is balanced when the piston is in all three positions.

24. The valve as specified in claim 20 wherein the valve is disposed in a hot/cold water temperature mixing valve.

25. The valve as specified in claim 24 wherein the valve is disposed in a hot/cold water temperature mixing valve.

26. A valve for controlling the flow of a fluid therethrough, comprising:
a main body having a wall defining a channel extending therethrough between an inlet port and an outlet port;
a member axially disposed in the main body; and
a piston having a proximal end and a distal end and axially disposed in the member and configurable in a first position whereby the fluid is permitted to flow from the inlet port through the valve, a second position distal the first position and established by a temperature sensitive actuator whereby the fluid is restricted from flowing through the valve, and a third position distal the second position whereby the fluid is permitted to flow from the inlet port through the valve, wherein a fluid pressure at the inlet port is not communicated to the piston proximal end when the piston is in the second position.

27. The valve as specified in claim 26 wherein the fluid pressure at the inlet port is communicated to the piston proximal end when the piston is in the third position.

28. The valve as specified in claim 26 further comprising a spring configured to urge the piston proximally.

29. The valve as specified in claim 28 wherein a fluid pressure across the piston is balanced when the piston is in all three positions.

* * * * *